(12) United States Patent
St. Clair et al.

(10) Patent No.: US 9,582,860 B2
(45) Date of Patent: Feb. 28, 2017

(54) TEMPORALLY SMOOTH VIDEO ENHANCEMENT

(71) Applicant: Google Inc., Mountain View, CA (US)

(72) Inventors: Timothy Sepkoski St. Clair, Menlo Park, CA (US); Tinglin Liu, Mountain View, CA (US); Sevket Derin Babacan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/808,208

(22) Filed: Jul. 24, 2015

(65) Prior Publication Data

US 2017/0024858 A1    Jan. 26, 2017

(51) Int. Cl.
*G06K 9/40*    (2006.01)
*G06T 5/00*    (2006.01)
(Continued)

(52) U.S. Cl.
CPC .......... *G06T 5/002* (2013.01); *G06K 9/00536* (2013.01); *G06K 9/00711* (2013.01);
(Continued)

(58) Field of Classification Search
CPC .... G06K 5/20; G06K 9/00228; G06K 9/0063; G06K 9/00711; G06K 9/00771; G06K 9/00785; G06K 9/32; G06K 9/3258; G06K 9/62; G06K 9/66; G06K 9/6268; G06K 2209/15; G06K 9/00087; G06K 9/00147; G06K 9/00181; G06K 9/00201–9/00355; G06K 9/00422; G06K 9/00456; G06K 9/00503; G06K 9/00536–9/00845; G06K 9/40–9/4628; G06K 9/6256; G06K 9/6267–9/6287; G06K 9/6292–9/6293; G06K 9/741–9/748;
(Continued)

(56) References Cited

U.S. PATENT DOCUMENTS

| | | | | |
|---|---|---|---|---|
| 7,227,893 B1 * | 6/2007 | Srinivasa | ........... | G06K 9/00771 348/155 |
| 7,634,108 B2 * | 12/2009 | Cohen | ................ | G06K 9/00228 382/103 |

(Continued)

OTHER PUBLICATIONS

Aufrichtig et al., "X-Ray Fluoroscopy Spatio-Temporal Filtering with Object Detection", IEEE Transactions on Medical Imaging, IEEE Service Center, Piscataway, NJ, vol. 14, No. 4, Dec. 1, 1995, pp. 733-746.

(Continued)

*Primary Examiner* — Jose Couso
(74) *Attorney, Agent, or Firm* — IP Spring

(57) ABSTRACT

Implementations generally relate to enhancing a video. In some implementations, a method includes classifying one or more objects in one or more frames of the video. The method further includes determining one or more filter parameters of one or more filters based on the classifying of the one or more objects. The method further includes smoothing one or more of the determined filter parameters based on the classifying of the one or more objects. The method further includes applying one or more of the filters with corresponding smoothed filter parameters to one or more frames of the video.

20 Claims, 5 Drawing Sheets

(51) Int. Cl.
*G06T 5/20* (2006.01)
*G06K 9/00* (2006.01)
*G06K 9/62* (2006.01)
*G06K 9/66* (2006.01)

(52) U.S. Cl.
CPC .............. *G06K 9/40* (2013.01); *G06K 9/6256* (2013.01); *G06K 9/66* (2013.01); *G06T 5/20* (2013.01); *G06T 2207/10016* (2013.01)

(58) Field of Classification Search
CPC .... G06K 2009/6864–2009/6871; G06T 5/002; G06T 5/10; G06T 7/20; G06T 7/2006; G06T 7/2033; G06T 7/204; G06T 7/2046; G06T 7/72053; G06T 7/208; G06T 2207/10016; G06T 2207/10032; G06T 2207/20144; G06T 2207/30232; G06T 2207/30236; G06T 7/403; G06T 2207/10004–2207/10021; G06T 2207/20024–2207/20032; G06T 2207/20172–2207/20204; G06T 2207/30221–2207/30268; G08G 1/04; G08G 1/08; G08G 1/087; G08G 1/164; G08B 13/19602; G08B 13/19606; G08B 13/19608; G08B 13/19613; H04N 7/181; H04N 7/183; H04N 5/00; H04N 5/144–5/145; H04N 5/23251–5/23254; H04N 5/23264; H04N 7/18; H04N 13/0014; H04N 13/0278; H04N 13/0468–13/0484; H04N 19/521; H04N 2013/0085; H04N 2201/3267
See application file for complete search history.

(56) References Cited

U.S. PATENT DOCUMENTS

| | | |
|---|---|---|
| 2007/0189627 A1 | 8/2007 | Cohen et al. |
| 2012/0250988 A1 | 10/2012 | Peng et al. |
| 2016/0078272 A1* | 3/2016 | Hammoud ........... G06K 9/0063 382/103 |

OTHER PUBLICATIONS

European Patent Office, International Search Report for International Patent Application No. PCT/US2016/041943, Oct. 26, 2016, 6 pages.
European Patent Office, Written Opinion for International Patent Application No. PCT/US2016/041943, Oct. 26, 2016, 12 pages.

* cited by examiner

500

TEMPORALLY SMOOTH VIDEO ENHANCEMENT

BACKGROUND

The popularity and convenience of digital video cameras as well as the widespread use of Internet communications have caused user-produced videos to become ubiquitous. Manual video editing systems for various consumer electronic devices and personal computers enable a user with knowledge and know-how to manipulate videos. Such video editing systems typically require the user to understand complicated and difficult instructions to manipulate the image. This level of knowledge places advanced editing features out of the grasp of the average user.

SUMMARY

Implementations generally relate to video enhancement. In some implementations, a method includes classifying one or more objects in one or more frames of the video. The method further includes determining one or more filter parameters of one or more filters based on the classifying of the one or more objects. The method further includes smoothing one or more of the determined filter parameters based on the classifying of the one or more objects. The method further includes applying one or more of the filters with corresponding smoothed filter parameters to one or more frames of the video.

With further regard to the method, in some implementations, the method further includes tracking one or more of the objects across a plurality of frames of the video, where the plurality of frames includes the one or more frames, and where the smoothing of one or more of the determined filter parameters is based on the tracking of the one or more tracked objects. In some implementations, the method further includes determining of the one or more filter parameters includes estimating the one or more filter parameters to apply in association with one or more of the frames of the video. In some implementations, one or more of the filters include one or more of a brightness filter, a contrast filter, a saturation filter, a tonal structure filter, a color filter, and a vignette filter. In some implementations, the classifying is based on one or more classification operations, and the smoothing of one or more of the determined filter parameters includes smoothing one or more of the classification operations. In some implementations, the classifying is based on one or more classification operations, where the smoothing of one or more of the determined filter parameters includes smoothing one or more classification operations, where the smoothing of the one or more of the classification operations includes smoothing a classification confidence interval across a plurality of frames, and where the plurality of frames includes the one or more frames. In some implementations, the smoothing of the one or more of the determined filter parameters includes smoothing one or more filter parameter estimation operations. In some implementations, the method further includes smoothing one or more outputs of one or more of the filters.

In some implementations, a non-transitory computer-readable storage medium carries program instructions thereon, where the instructions when executed by one or more processors cause the one or more processors to perform operations including: tracking one or more objects across a plurality of frames of a video; determining one or more filter parameters of one or more filters based on the tracking of the one or more objects; smoothing one or more of the determined filter parameters based on the tracking of the one or more objects; and applying one or more of the filters with corresponding smoothed filter parameters to one or more frames of the plurality frames of the video.

With further regard to the non-transitory computer-readable storage medium, in some implementations, to determine the one or more filter parameters, the instructions further cause the one or more processors to perform operations including estimating the one or more filter parameters to apply in association with one or more frames of the plurality frames of the video. In some implementations, one or more of the filters include one or more of a brightness filter, a contrast filter, a saturation filter, a tonal structure filter, a color filter, and a vignette filter. In some implementations, the instructions further cause the one or more processors to perform operations including classifying the one or more objects in one or more frames of the plurality frames of the video, where the classifying is based on one or more classification operations, and where, to smooth one or more of the determined filter parameters, the instructions further cause the one or more processors to perform operations including smoothing one or more of the classification operations. In some implementations, to smooth one or more of the determined filter parameters, the instructions further cause the one or more processors to perform operations including smoothing one or more filter parameter estimation operations. In some implementations, the instructions further cause the one or more processors to perform operations including smoothing one or more outputs of one or more of the filters.

In some implementations, a system includes one or more processors, and logic encoded in one or more tangible media for execution by the one or more processors. When executed, the logic is operable to perform operations including: determining one or more filter parameters of one or more filters based on one or more frames of a video; smoothing one or more of the determined filter parameters based on the one or more frames; applying one or more of the smoothed filter parameters to one or more of the frames of the video; and smoothing one or more outputs of one or more of the filters.

With further regard to the system, in some implementations, the logic when executed is further operable to perform operations including tracking one or more of the objects across a plurality of frames of the video, where the plurality of frames includes the one or more frames, and where the smoothing of one or more of the determined filter parameters is based on the tracking of the one or more tracked objects. In some implementations, to determine the one or more filter parameters, the logic when executed is further operable to perform operations including estimating the one or more filter parameters to apply in association with one or more of the frames of the video. In some implementations, one or more of the filters include one or more of a brightness filter, a contrast filter, a saturation filter, a tonal structure filter, a color filter, and a vignette filter. In some implementations, the logic when executed is further operable to perform operations including classifying the one or more objects in one or more frames of the video, where the classifying is based on one or more classification operations, and where, to smooth one or more of the determined filter parameters, the logic when executed is further operable to perform operations including smoothing one or more of the classification operations. In some implementations, the smoothing one or more filter outputs may be based on a weighted average of filter output values across a plurality of frames, and where the plurality of frames includes the one or more frames.

In some implementations, a method includes means for classifying one or more objects in one or more frames of the video. The method further includes means for determining one or more filter parameters of one or more filters based on the means for classifying the one or more objects. The method further includes means for smoothing one or more of the determined filter parameters based on the classifying of the one or more objects. The method further includes means for applying one or more of the filters with corresponding smoothed filter parameters to one or more frames of the video.

With further regard to the method, in some implementations, the method further includes means for tracking one or more of the objects across a plurality of frames of the video, where the plurality of frames includes the one or more frames, and where the means for smoothing one or more of the determined filter parameters is based on the means for tracking the one or more tracked objects. In some implementations, the means for determining the one or more filter parameters includes means for estimating the one or more filter parameters to apply in association with one or more of the frames of the video. In some implementations, one or more of the filters include one or more of a brightness filter, a contrast filter, a saturation filter, a tonal structure filter, a color filter, and a vignette filter. In some implementations, the means for classifying is based on one or more classification operations, and the means for smoothing one or more of the determined filter parameters include means for smoothing one or more of the classification operations. In some implementations, the means for classifying is based on one or more classification operations, where the means for smoothing one or more of the determined filter parameters includes means for smoothing one or more classification operations, where the means for smoothing the one or more of the classification operations includes means for smoothing a classification confidence interval across a plurality of frames, and where the plurality of frames includes the one or more frames. In some implementations, the means for smoothing the one or more of the determined filter parameters includes smoothing one or more filter parameter estimation operations. In some implementations, the method further includes means for smoothing one or more outputs of one or more of the filters.

DETAILED DESCRIPTION

Implementations generally relate to computer-implemented methods, non-transitory computer-readable storage media, and computer systems that provide enhancements to videos. As described in more detail below, implementations determine and smooth aspects of filter parameters, and apply corresponding filters to frames of a video such that when applied to the video, enhanced videos appear smooth across multiple frames over time. The enhanced video appears smooth in that the video does not exhibit various types of discontinuities, which are described in more detail below.

In some implementations, a system classifies one or more objects in one or more frames of a video. For example, the system may detect a given object and then classify that object as a face. The system further determines one or more filter parameters of one or more filters based on the classifying of the one or more objects. For example, the system may determine vignette filter parameters that would be appropriate for the video, because the video shows a face. The system further smooths one or more of the determined filter parameters based on the classifying of the one or more objects. For example, due to factors such as noise, a given object such as a face might be present in some frames of the video but may not be detected in those frames. The system may smooth a filter parameter operation in order to eliminate flicker in the video. The system further applies one or more of the filters with corresponding smoothed filter parameters to one or more frames of the video to enhance the video. The system further smooths one or more filter outputs to enhance the video. Various other example implementations are described in more detail below.

Implementations described herein address a challenge in videos in that video enhancements should look not only consistent and realistic on a single frame, but should also look natural as the video plays over time. As described in more detail below, implementations achieve a natural look by ensuring that changes vary smoothly over time. Implementations minimize and/or eliminate various types of undesirable discontinuities in frames of a video that may be present in the video. For example, a video may display flicker due to noise or other conditions. Such flicker may be caused by one or more different types of discontinuities, depending on the particular scenario. Example discontinuities may include feature discontinuities, estimation discontinuities, and output discontinuities. These discontinuities and implementations for handling these discontinuities are described in more detail below.

Figure 1:
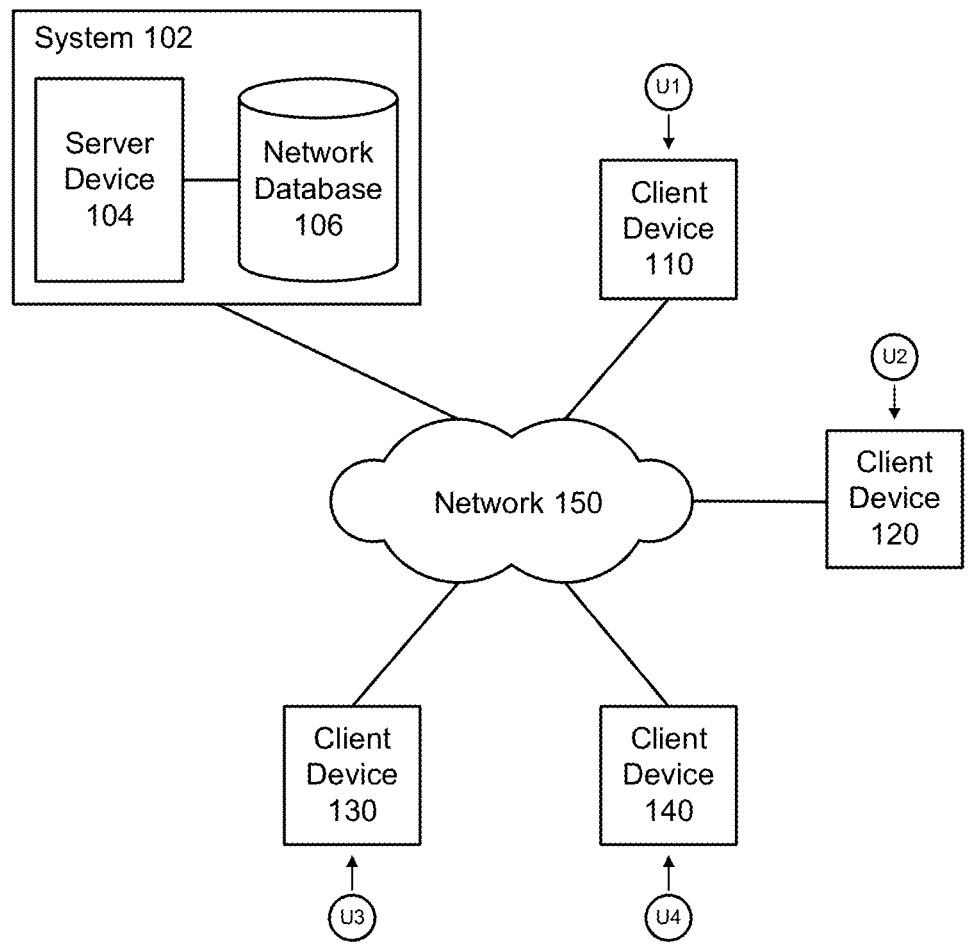
FIG. 1 illustrates a block diagram of an example network environment, according to some implementations.

FIG. 1 illustrates a block diagram of an example network environment 100, according to some implementations. In some implementations, network environment 100 includes a system 102, which includes a server device 104 and a network database 106. Network environment 100 also includes client devices 110, 120, 130, and 140, which may communicate with each other directly or via system 102. Network environment 100 also includes a network 150. Other implementations are possible. For example, some or all processing may be performed on a single device (e.g., a mobile device, desktop device, etc.).

For ease of illustration, FIG. 1 shows one block for each of system 102, server device 104, and network database 106, and shows four blocks for client devices 110, 120, 130, and 140. Blocks 102, 104, and 106 may represent multiple systems, server devices, and optionally network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit media to each other.

In the various implementations described herein, a processor of system 102 and/or any client device 110-140 causes the elements described herein (e.g., videos, etc.) to be displayed in a user interface on one or more display screens.

In various implementations, system 102 may utilize an image recognition technique to detect a face or other objects in one or more photos. Objects may also include natural objects such as mountains, trees, beaches, animals, as well as other objects such as balls, bottles etc. Recognition techniques may be implemented at system 102 and/or on a client device. Example implementations of recognition techniques are described in more detail below.

Implementations may apply to any network system and/or may apply locally for an individual user. For example, implementations described herein may be implemented by the system 102 and/or any client device 110-140. System 102 may perform the implementations described herein on a stand-alone computer, tablet computer, smartphone, etc. System 102 or a client device 110-140 may perform implementations described herein individually or in combination with other devices.

Figure 2:
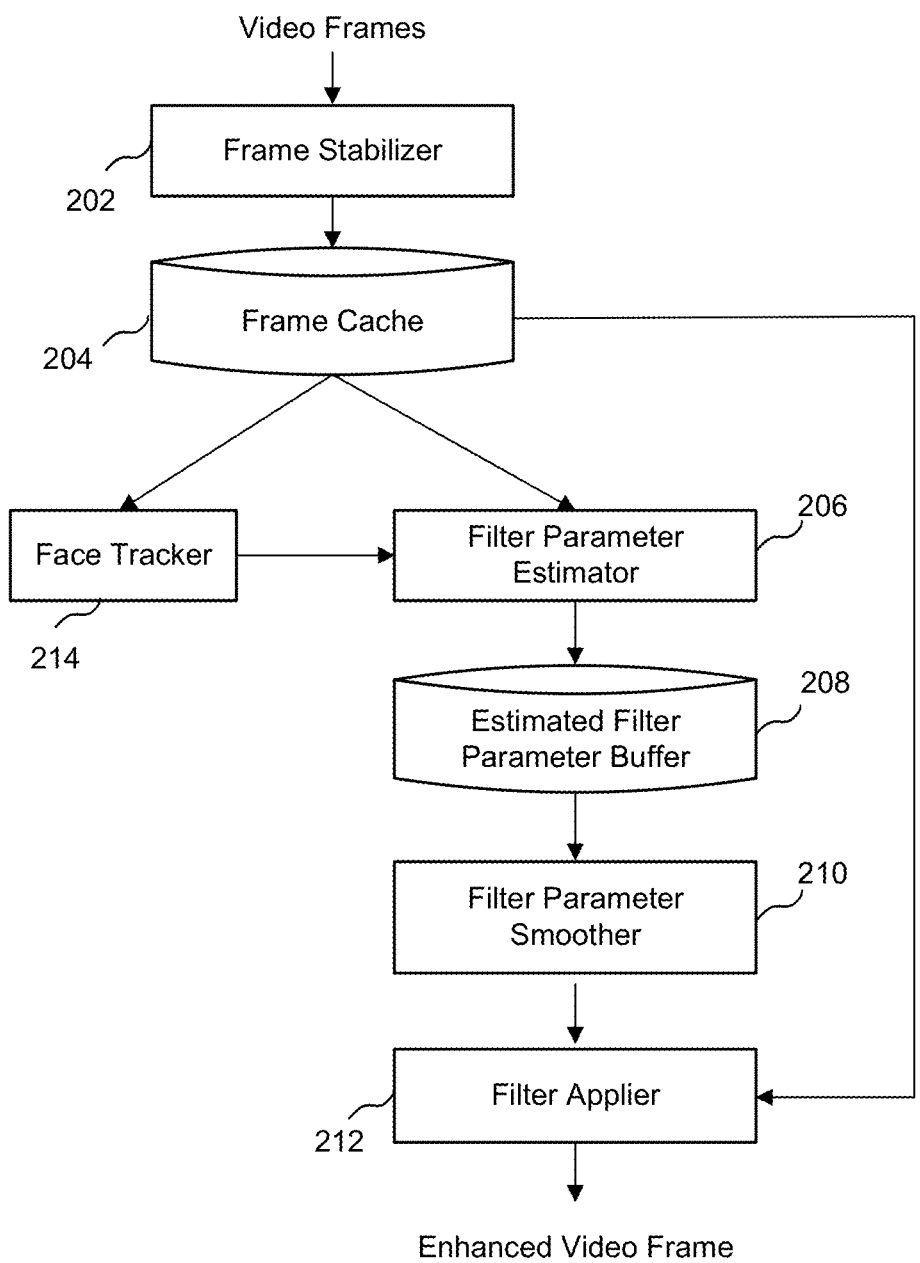
FIG. 2 illustrates a block diagram of an example video enhancer, according to some implementations.

FIG. 2 illustrates a block diagram of an example video enhancer 200, according to some implementations. In various implementations, video enhancer 200 may be implemented by system 102 of FIG. 1. In various implementations, one or more components of video enhancer 200 may be integral and/or accessible and controlled by system 102 of FIG. 1. As shown, video enhancer 200 includes a frame stabilizer 202, frame cache 204, filter parameter estimator 206, estimated filter parameter buffer 208, filter parameter smoother 210, filter applier 212, and face tracker 214. The operations/functions, and inputs and outputs of these components are described in more detail below. As shown, these components of the video enhancer are arranged in a hierarchy, and may be referred to as an estimation hierarchy. The particular configuration and order of the components in the estimation hierarchy may vary, depending on the particular implementation. As described in more detail below, implementations smooth frames of a given video at one or more levels of the estimation hierarchy.

For ease of illustration, FIG. 2 shows one block for each of frame stabilizer 202, frame cache 204, filter parameter estimator 206, estimated filter parameter buffer 208, filter parameter smoother 210, filter applier 212, and face tracker 214. Blocks 202, 204, 206, 208, 210, 212, and 214 may represent multiple devices, systems, etc. In other implementations, video enhancer 200 may not have all of the components shown and/or may have other elements including other types of elements instead of, or in addition to, those shown herein.

Various example implementations of video enhancer 200, some of its components, and various operations are described in detail below in connection with FIG. 3.

Figure 3:
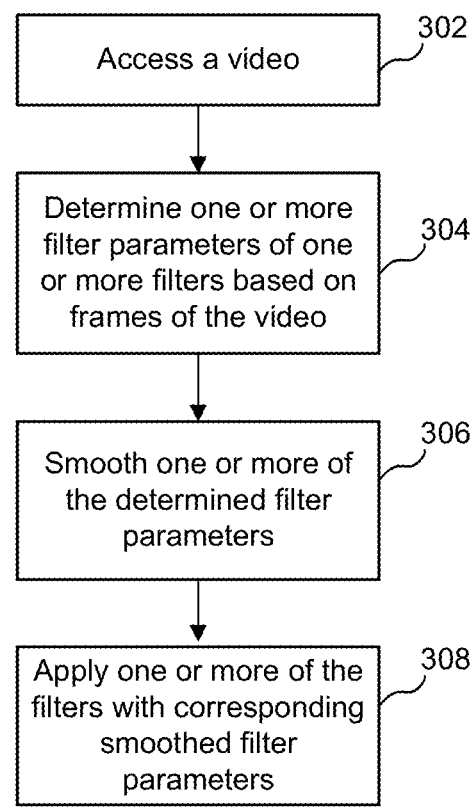
FIG. 3 illustrates an example flow diagram for enhancing a video, according to some implementations.

FIG. 3 illustrates an example flow diagram for enhancing a video, according to some implementations. Referring to both FIGS. 2 and 3, a method is initiated in block 302, where system 102 or any other suitable device accesses a video.

In various implementations, video enhancer 200 receives frames of the video at frame stabilizer 202. In some implementations, video enhancer 200 may access or obtain frames of a video from any suitable storage location. Video enhancer 200 may also access or obtain frames of a video when a user uploads the video to video enhancer 200 or after a user adds the video to one or more media albums (e.g., in a social network system). In some implementations, video enhancer 200 may enable a video camera device (e.g., smart phone, video camera, etc.) of the user to automatically upload videos to video enhancer 200 as the video camera device captures videos.

In various implementations, video enhancer 200 stabilizes one or more frames of the video in order to reduce or eliminate shakiness in videos. Video enhancer 200 may use any suitable stabilization techniques to stabilize frames of a video. In various implementations, frame stabilizer 202 of video enhancer 200 may perform the stabilizing of frames of a video.

In various implementations, after stabilization, the stabilized frames of the video may be stored in any suitable memory or cache layer. Being stored in a cache layer helps to reduce memory usage. In various implementations, the frames of the video may be stored in any suitable memory or cache layer such as frame cache 204 until accessed by video enhancer 200.

In block 304, video enhancer 200 determines one or more filter parameters of one or more filters based on frames of the video. In various implementations, each set of filter parameters may be associated with a particular filter. For example, filter parameters such as brightness, contrast, and saturation may be associated with a brightness-contrast-saturation (BCS) filter. In some implementations, a brightness filter parameter may be associated with a brightness filter, a contrast filter parameter may be associated with a contrast filter, and a saturation filter parameter may be associated with a saturation filter. In some implementations, a given filter parameter may be associated with more than one filter. For example, a filter parameter such as saturation may be associated with a BCS filter and associated with a selective color pop filter. In such scenarios where a given filter parameter is associated with multiple filters, the given filter parameter value may vary from filter to filter, depending on the particular implementation.

As described in more detail below, video enhancer 200 may apply various types of filters with corresponding filter parameters to different frames of a video. Such filters may include, for example, a BCS filter, a tonal structure filter, a color filter, a selective color pop filter, a vignette filter, etc.

The following are example descriptions of some filters. In some implementations, a BCS filter enhances brightness, contrast, and saturation. In some implementations, a tonal structure filter may apply fill light, warmth, and structure. In some implementations, a color filter such as a selective color pop filter may selectively boost or enhance one or more colors (e.g., green hue, blue hue, green and blue hue, etc.). For example, a selective color pop filter may selectively boost the greens and blues in landscapes. In some implementations, color filter such as a warmth filter may adjust color temperature (e.g., white balance). In some implementations, a color filter such as saturation filter may apply equally to multiple or all colors. In some implementations, a vignette filter darkens the edge (e.g., when there is a face detected in the frame). In some implementations, a noise reduction filter reduces noise in images. In some implementations, a motion deblurring filter sharpens blurry frames. In some implementations, a gradient smoothing filter reduces banding artifacts in smooth gradients such as the sky.

Other types of filters are possible. For example, other filters may include a BCS-warmth (BCSW) filter, a fill light filter, a color/tone stabilization filter, etc.

In various implementations, to determine filter parameters for filters, video enhancer 200 estimates one or more filter parameters of one or more corresponding filters to be applied in association with one or more frames of the video based on one or more techniques. For example, in various implementations, video enhancer 200 may determine filter parameters of one or more filters based on classifying of one or more objects in one or more frames of the video. Example implementations directed to the classifying of one or more objects in one or more frames of a video are described in more detail below. In various implementations, video enhancer 200 may determine one or more filter parameters of one or more filters based on tracking one or more objects across multiple frames of the video. Example implementations directed to the tracking of one or more objects across multiple frames of a video are described in more detail below. In various implementations, filter parameter estimator 206 of video enhancer 200 may perform the estimation of filter parameters.

In certain implementations, to determine filter parameters for filters to be applied to frames of a video, video enhancer 200 detects one or more input features or objects in some frames of the video. Video enhancer 200 then classifies the one or more detected objects in each of the one or more frames of the video. For example, video enhancer 200 may detect an object and then classify the object (e.g., as a face, as a mountain, etc.). In various implementations, the terms "objects" and "features" may be used interchangeably. Video enhancer 200 then determines one or more filter parameters based on the classification of one or more of the detected features. For example, if a given object in one or more frames of a video is a face, video enhancer 200 may determine filter parameters for a vignette filter that may be appropriate to be applied to the video.

Determining filter parameters based on the classification of objects in a video enables effective enhancement of a video, appropriate to the classified objects. In some implementations, if video enhancer 200 detects and classifies a face in a frame, video enhancer 200 would not apply a local contrast. This may be, for example, because local contrast may tend to emphasize blemishes (e.g., pimples, moles, scares, injuries, etc.) on a person's face. In some implementations, if video enhancer 200 detects and classifies a mountain, video enhancer 200 would apply more local contrast, because enhanced local contrast may improve the appearance of mountainous landscapes.

In some implementations, the presence or absence of particular objects and/or the presence or absence of particular object attributes may render one or more filters unneeded or may render one or more filter parameters for such filters unneeded or needing adjustment. In an example involving a selective color pop filter, video enhancer 200 may disable the selective color pop filter if a particular color (e.g., green, blue, etc.) is not present.

In another example involving a fill light filter, applying a fill light filter when there are no shadows (e.g., overexposed image, etc.) may not have much of an effect. In some implementations, video enhancer 200 may determine that fill light is not needed. Video enhancer 200 might apply a fill light filter but adjust one or more filter parameter values (e.g., user a lower strength of fill light, etc.). In some implementations, video enhancer 200 may disable a particular filter (e.g., the fill light filter, etc.) if predetermined conditions are met. For example, video enhancer 200 may disable a fill light filter when the light strength is determined to be below a threshold. Other smoothly varying analyses are described in more detail below.

In some implementations, video enhancer 200 may estimate one or more filter parameters based on every Nth frame of the video. For example, in some implementations, video enhancer 200 may estimate one or more filter parameters based on every frame of the video. In some implementations, video enhancer 200 may estimate one or more filter parameters based on every other frame of the video. The value of N may vary and may depend on the specific implementations. In some implementations, video enhancer 200 may utilize any suitable estimation technique to estimate filter parameters.

In some implementations, video enhancer 200 may determine scene changes in the video. Difference scenes in a given video may contain different objects to be classified. As such, video enhancer 200 may estimate filter parameters based on different scene changes.

Video enhancer 200 may access scene change information in order to determine scene changes. Video enhancer 200 may also analyze frames to detect significant changes over multiple frames (e.g., over successive frame) in order to determine scene changes. In some implementations, video enhancer 200 may analyze one frame per scene, as it would be unlikely for the objects in a given scene to change substantially. Analyzing one frame or a subset of frames per scene would make the enhancement process less computationally intensive, decrease processing time and decreasing processing latency, as well as to optimize memory.

In some implementations, video enhancer 200 may determine filter parameters by first classifying one or more objects in one or more frames of a video and referring to a lookup table. For example, if video enhancer 200 detects and classifies a human face, video enhancer 200 may determine that a vignette filter is appropriate to be applied to frames that include the face. In another example, if video enhancer 200 determines that the video has an indoor scene, video enhancer 200 may determine that a BCS filter is appropriate to be applied to the indoor frames.

Various types of discontinuities in frames of a video may be present in a video, and such discontinuities may be undesirable. For example, a video may display flicker due to noise or other conditions. Such flicker may be caused by one or more different types of discontinuities, depending on the particular scenario. Example discontinuities may include feature discontinuities, estimation discontinuities, and output discontinuities. These discontinuities and implementations for handling these discontinuities are described in more detail below.

Feature discontinuities may occur when the estimation is relying on discrete features, as is the case with object classification and face detection (e.g., binary classifications such as whether a face is present or not). For example, a person's face might be present when being captured on video. However, due to noise or other conditions such as poor lighting, the face might be detected in some frames but not in others. In another example, feature discontinuities may include scene changes in a video or a tracked object being lost in a blurry frame.

In various implementations, feature discontinuities may be resolved by classification smoothing. One technique for classification smoothing is where video enhancer 200 selects a single classification for the entire video. In other words, video enhancer 200 may treat multiple frames in a video (e.g., all frames between successive scene changes) as having a particular object present (e.g., a face) when the object is present in some of the frames of the video. In some implementations, classification smoothing may be based on probabilistic, confidence-interval-based determination of the presence (or absence) of a particular object in frames of a video. In various implementations, face detection may be smoothed by using any suitable face tracking code. Various implementations for handling feature discontinuities are described in more detail below.

In various implementations, the classifying of objects is based on one or more classification operations, and to smooth one or more of the determined filter parameters, video enhancer 200 may smooth one or more of the classification operations or functions. Examples of classification operations are described in more detail below. For example, in some implementations, video enhancer 200 may adjust one or more inputs to one or more filter parameter estimations. Inputs may include, for example, objects in a video. In some implementations, one technique for smoothing an operation is for video enhancer 200 to classify more frames or to classify fewer frames as having a particular object such as a face. This technique involves adjusting a confidence interval associated with a particular object. Example implementations are described in more detail below.

In various implementations, to smooth one or more classification operations or functions, video enhancer 200 may smooth a classification confidence interval across multiple frames of a video. This will influence whether to apply a particular filter and its corresponding filter parameters based on the classification of a given object. For example, when detecting an object (e.g., a face, a mountain, landscaping, etc.), a confidence interval or level of confidence (e.g., between 0-100%) may indicate the likelihood that the object is present in particular frames of a video.

In some implementations, video enhancer 200 may set a predetermined confidence threshold to a predetermined value (e.g., 50%). For example, video enhancer 200 may deem an object (e.g., a mountain) to be present if the confidence interval is 50% or more. In other words, if the confidence interval of a particular object meets the predetermined confidence threshold for a given frame, video enhancer 200 may deem the object to be present in the given frame. Otherwise, video enhancer 200 may deem the object to not be present if the confidence threshold is 49% or less. In other words if the confidence interval of a particular object does not meet the predetermined confidence threshold for a given frame, video enhancer may deem the object to not be present in the given frame.

In some implementations, video enhancer 200 may determine the confidence of the object for each frame, and then apply a smoothing function to the confidence interval of each frame in order to smooth out the likelihood that the object is in a given frame. Example implementations are described in more detail below.

In some implementations, let c(a, i)=confidence of feature a in frame 1. Video enhancer 200 may define a smoothing function f, which combines the confidence of nearby frames. In some implementations, video enhancer 200 may take a weighted average of the confidence in nearby frames (e.g., using a Gaussian distribution for the weights), and discard outliers.

For example, if the confidence threshold is 50%, and the confidence interval values in different frames are close in value yet some values are above and some below 50% (e.g., 51, 49, 53, 48, etc.), the object (e.g., a mountain) may appear to be popping in and out of the video. In some implementations, video enhancer 200 may smooth the classification by lowering or raising the confidence threshold by a particular amount in order to group the values together and to thus apply the same classification to those frames, thereby smoothing the classification.

Estimation discontinuities may occur when the estimator outputs discrete values. For example, a selective color pop estimator may use a hard threshold to increase saturation. A brightness-contrast-saturation (BCS) filter may also use a hard threshold to increase saturation and/or brightness. In some scenarios, the particular filter may adjust the filter parameter (e.g., saturation, brightness, etc.) in some frames but not in others due to estimation discontinuities. Such estimation discontinuities may result in visual changes (e.g., across multiple frames of a video).

In some implementations, for a given object where the confidence interval meets the hard threshold, the filter may adjust certain filter parameters in different directions, depending on the particular implementation. For example, in some implementations, a color pop filter may have multiple filter parameters such as different colors, etc. Considering the red-green-blue (RGB) color space, the saturation for red may be normally set to 90%, the saturation for green set to 80%, and the saturation for blue set to 70%. If a particular object is identified, video enhancer 200 may adjust saturation, such that the saturation for red is increased to 100%, the saturation for green remaining at 80%, and the saturation for blue set to 60%. The percentages described in this particular example are exemplary and non-limiting, other percentages are possible depending on the particular implementation.

In another example, a tonal structure filter may apply fill light, warmth, and structure, where the fill light increases the brightness of shadows, rather than increasing brightness across every pixel in a video frame. This is an example of a local filter where the amount of adjustment of a pixel depends on the neighborhood of the pixel. The tonal structure filter may also adjust the warmth, which is a hue shift. For example, the tonal structure filter may adjust the whole image to be more red. The tonal structure filter may also adjust the structure, where the structure is the local contrast emphasizing edges and sharp boundaries.

In some implementations, such issues may be resolved by using a smooth transition function between values (e.g., by smoothing thresholds, etc.). In other cases, the estimated parameters may be filtered across a buffer of frames (e.g., 50 frames, etc.). Example filtering approaches may include Gaussian smoothing, Kalman filtering, optimization used by stabilization, etc. In some implementations, (e.g., for functions that cannot be smoothed), video enhancer 200 may smooth filter outputs (e.g., smooth output parameter values across frames, etc.). Various other implementations for handling feature discontinuities are described in more detail below.

In various implementations, to smooth one or more of the determined filter parameters, video enhancer 200 may smooth one or more filter parameter estimation operations. For example, video enhancer 200 may smooth a threshold used in the filter parameter estimation operations to determine brightness. Various example implementations of smoothing filter parameter operations are described in more detail below.

In some implementations, video enhancer 200 may smooth one or more filter parameter estimation operations based on filter parameter weighting functions. For example, in some implementations, video enhancer 200 may designate one or more of the objects as global objects. Video enhancer 200 may then apply one or more filters with corresponding smoothed filter parameters to all frames of the video or to no frames of the video based on the designation. Various example implementations are described in more detail below.

In various implementations, video enhancer 200 tracks one or more objects or features across multiple frames of the video (e.g., tracking an object from frame to frame). For example, video enhancer 200 may track a face across multiple frames. In various implementations, face tracker 214 of video enhancer 200 may perform the tracking of faces and other features.

In various implementations, the estimation of parameters may be affected by not only the presence or absence of a particular object (e.g., a face) in a set of frames, but also by the location of a particular object if present. For example, in some implementations, video enhancer 200 may apply a vignette filter when there is a face at or near the center of some frames. In some implementations, the parameters of a BCS filter may prioritize face appearances, etc. The vignette filter may darken corners and edges of an image. As such, the vignette filter uses the location of the face in order to center the vignette on the face.

In various implementations, face tracker 214 provides object position information, which includes the location of the object (e.g., a face, etc.) in a frame. Face tracker 214 may use any suitable tracking technique, depending on the particular implementation. For example, in some implementations, face tracker 214 may use any suitable face tracker library for handling tracking. While some implementations are described in the context of tracking faces, these implementations and others may also apply to other types of objects (e.g., mountains during panning, animals moving across a scene, etc.).

In some implementations, if a set of frames contain a face but one or more frames in the set is blurry, face tracker 214 might not detect the face on the blurry frames. In some implementations, face tracker 214 may determine that the face is present, but not detected in a given frame. For example, face tracker 214 may detect the face before and after the given frame. In some implementations, face tracker 214 may interpolate between frames in order to estimate where the face may be located. In some implementations, where there are multiple frames that contain the face but where the face is undetected, face tracker 214 may interpolate a path where the face may be located.

In some implementations, some objects may be tracked across multiple frames, rather than independently detected in each frame. This is useful for smoothing final results. For example, for some objects or features, it may not matter which frames the object appears within in the frames of a video. Video enhancer 200 may designate the object as a global object and apply one or more particular filters and corresponding filter parameters to all frames of the video or to no frames of the video.

For example, if video enhancer 200 detects and classifies mountains in some frames in a video, video enhancer 200 may classify the entire video as a landscape video, then apply the filter parameter estimations for a mountain and/or landscape over the entire video. In other words, video enhancer 200 might not determine which particular frames contain or do not contain the mountain. As described in other implementations herein, video enhancer 200 may classify a sequence of frames that are part of a scene that include mountains, and then apply the filter parameter estimations for a mountain and/or landscape over the sequence of frames of the video.

In some scenarios, there may be two different types of objects in the same frames of a video, where each object may have different filter parameters that may apply. In some implementations, video enhancer 200 may rank one object higher (e.g., faces over mountains, etc.) and apply a filter based on filter parameters determined based on the higher-ranking object. In some implementations, video enhancer 200 may apply two to or more filters based on filter parameters determined two or more corresponding objects (e.g., the highest ranking objects, etc.).

In various implementations, estimated filter parameter buffer 208 may provide a buffer layer for estimated filter parameters for use when requesting the smoothed parameters for each frame. Estimated filter parameter buffer 208 provides a buffer layer between filter parameter estimator 206 and the filter parameter smoother 210. In various implementations, estimated filter parameter buffer 208 functions like a moving buffer window by inserting the new estimated filter parameters at its beginning and dropping one or more estimated filter parameters at its end.

As described in more detail herein, video enhancer 200 smooths filter parameters across a buffer of frames. This results in temporally smooth videos and minimizes and/or eliminates discontinuities (e.g., discontinuities that may appear at the output and produce negative effects, etc.).

Referring again to FIGS. 2 and 3, in block 306, video enhancer 200 smooths one or more of the determined filter parameters. In various implementations, video enhancer 200 smooths one or more of the determined filter parameters based on one or more frames of a video. For example, as described in more detail herein, in various implementations, video enhancer 200 smooths one or more of the determined filter parameters based on classifying of one or more objects in one or more frames of the video. In some implementations, video enhancer 200 smooths one or more of the determined filter parameters based on tracking of one or more objects across multiple frames of a video. In various implementations, filter parameter smoother 210 of video enhancer 200 may perform smoothing of estimated filter parameters.

In some implementations, some filters or objects/features are already inherently smooth. As such, no additional smoothing is necessary. In some scenarios, where there is a scene change in a video, video enhancer 200 may detect scene-change boundaries, and may relax smoothing requirements at those boundaries. For example, it may be acceptable for a face to not be detected in a scene change. In some implementations, to detect scene change boundaries, video enhancer 200 may compute differences between successive frames, and set a predetermined threshold. If the difference meets predetermined criteria, video enhancer 200 may deem that a scene change occurred. In some implementations, smoothing may be applied across frames within an individual scene but not across frames when there is a scene change between frames. In some implementations, smoothing may be applied across scene changes (e.g., when a feature is retained after the scene change). In some implementations, video enhancer 200 may use video encoding information to speed up the difference computation. In some implementations, video enhancer 200 may track local objects/feature, color histograms, etc.

In some implementations, video enhancer 200 may process a video by decoding the video into complete frames (e.g., RGB-bitmaps, etc.), and then re-encode the video after processing. In some implementations, the encoded differences may be used to speed up processing. For example, encoded differences may be used to speed up processing by copying over changes in an I-frame that would be repeated in the difference frames. In some implementations, encoded motion information may be used for certain techniques such as to hold certain features constant (e.g., such as a dog walking detected in multiple frames).

In some implementations, Gaussian kernel smoothing technique may be used for estimating a real valued function by using its noisy observations (e.g., when no parametric model for the function is known, etc.). In some implementations, the Gaussian kernel may be expressed with the following equation: $K(x^*,x_i)=\exp(-(x^*-x_i)^2/2b^2)$. In some implementations, close samples (e.g., closer frames) are given more weight such that estimated filter parameters change gradually and continuously. In some implementations, a Gaussian kernel smoother may be run on each parameter, where different kernel sizes may be used for different parameters (e.g., tuning the smoothing strength on each dimension of the parameter space).

In some implementations, a Kalman filter, also known as linear quadratic estimation, may be used. In some implementations, the Kalman filter may use a series of measurements observed over time, containing noise and other inaccuracies, and produces estimates of unknown variables that tend to be more precise than those based on a single measurement alone.

In some implementations, video enhancer 200 smooths one or more filter operations. If the filter parameter estimation operation is smooth, and the inputs to the operations are smooth over time, then the output of the function is likely to be smooth over time. For example, if the predetermined threshold for mountains is 50% and if the confidence interval of a given object being a mountain is 10% confidence that the object is a mountain, the confidence interval would be clearly too low for the objected to be deemed a mountain. As such, video enhancer 200 would not apply filter parameters based on a mountain object classification. Conversely, if the predetermined threshold for mountains is 50% and if the confidence interval of a given object being a mountain is 90% confidence that the object is a mountain, the confidence interval would be clearly high enough for the objected to be deemed a mountain. As such, video enhancer 200 would apply corresponding filter parameters. The percentages described in this particular example are exemplary and non-limiting, other percentages are possible depending on the particular implementation.

As indicated above, in some implementations, video enhancer 200 may change one or more hard thresholds to smooth weighting functions. In some implementations, for the operations of a filter having a brightness filter parameter (e.g., a BCS filter, etc.), video enhancer 200 may set or estimate the brightness by increasing the brightness by a fixed amount when the average pixel value measured is over a predetermined threshold. In some implementations, video enhancer 200 may smooth the filter operations by applying a sinusoidal weight around the predetermined threshold. Continuing with the above example with the mountain, if the predetermined threshold for mountains is 50% and if the confidence interval of a given object being a mountain is 48% or 52%, the confidence interval would be on the cusp of the object being deemed a mountain. As such, video enhancer 200 may apply a sinusoidal weight around the predetermined threshold, where the video enhancer 200 interpolates around the predetermined threshold of 50% in order to smooth the filter operations. The percentages described in this particular example are exemplary and non-limiting, other percentages are possible depending on the particular implementation.

In some scenarios, if the filter operation cannot be smoothed, video enhancer 200 may apply a smoothing function on the output of the filter by applying a smoothing function over the estimated parameters in nearby frames. Example scenarios where filter operation cannot be smoothed may be where the technique that detects features does not give a confidence value (e.g., if the object detection technique provides a binary output regarding presence of an object in a frame, parameter smoothing based on confidence may not be feasible). If the filter parameters cannot be smoothed, the filter output may have discontinuities. For example, different results from frame to frame (e.g., the mountain detected only sometimes) may result in different filter parameter estimations (e.g., sometimes a brightness of 4, sometimes a brightness of 7, etc.). In various implementations, video enhancer 200 may apply a smoothing function to the output of a filter in order to enhance the video.

Referring again to FIGS. 2 and 3, in block 308, video enhancer 200 applies one or more filters with corresponding smoothed filter parameters to one or more frames of the video to enhance the video. In some implementations, video enhancer 200 applies one or more of the smoothed filter parameters of one or more corresponding filters to each of one or more frames or sets of frames of the video. In various implementations, filter applier 212 of video enhancer 200 may perform the application of filter parameters in association with corresponding filters.

As indicated herein, video enhancer 200 applies smoothed filter parameters temporally to frames of the video. In various implementations, temporal application means that filter application occurs over multiple successive frames such that smoothing produces enhanced video that is smooth across those successive frames (e.g., temporally smooth). As such, in various implementations, video enhancer 200 applies one or more filters with smoothed filter parameters over a series of frames. Implementations minimize and/or eliminate discontinuities in filter applications and how the parameters map to actual changes in an image. For example, implementations minimize and/or eliminate jumps in histogram-based adjustments as a group of pixels moves from one bin of pixels to another.

In some implementations, output discontinuities may be addressed on a per-filter basis. For example, in some implementations, video enhancer 200 may convert color bins used by selective color pop to a continuous distribution or smoothed over time (e.g., over a series of frames). In some implementations, video enhancer 200 may run multiple iterations of a given filter with different parameter values and then utilize a weighted average of to produce output video frames. Various other implementations for handling output discontinuities are described in more detail below.

In various implementations, video enhancer 200 may smooth one or more filter outputs of one or more filters, which helps to address output discontinuities. In some scenarios, if the filter applied to a given frame does not vary smoothly with smooth filter parameters, video enhancer 200 may smooth the filter output. As above, it may be preferable to change the filter to vary smoothly, if possible. Otherwise, the output may be smoothed by applying a filter over a range of input parameters and then applying a smoothing function over the various outputs.

In various implementations, video enhancer 200 may smooth one or more filter outputs based on a weighted average of filter output values across multiple frames of a video. For example, if brightness is to be increased by 5, video enhancer 200 may apply a filter separately with values 3, 4, 6 and 7, and then take a weighted average of the 5 results. In some implementations, the weighting may be based on a Gaussian function, for example.

As indicated herein, different types of discontinuities may occur. By smoothing at one or more discontinuity occurrence, implementations described herein ensure that results are smooth over the range of inputs, without introducing unnatural over-smoothing.

In some implementations, video enhancer 200 may apply any one or more of the smoothing techniques. For example, in some implementations, video enhancer 200 may apply one or more smoothing techniques to the input of a given filter parameter estimation operation. In some implementations, video enhancer 200 may apply one or more smoothing techniques to a given filter parameter estimation operation. In some implementations, video enhancer 200 may apply one or more smoothing techniques to the output of a given filter. In various implementations, smoothing at some or all of the stages is possible depending on the particular implementation. Smoothing at any one or more of these stages may be carried out, depending on the particular implementations.

Figure 4:
FIG. 4 illustrates an example video frame, according to some implementations.

FIG. 4 illustrates an example video frame 400, according to some implementations. As shown, the left side 402 illustrates an unedited/unenhanced version. The right side 404 illustrates an edited/enhanced version.

Implementations described herein provide various benefits. For example, implementations automatically produce enhanced videos with temporally smooth edits. Implementations provide automatic enhancements to video that not only look consistent and realistic on a single frame, yet look natural as the video plays over time. Implementations also improve computational efficiency and optimize memory usage of video enhancement.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users to specify and/or consent to the use of personal information, which may include system 102 using their faces in images or using their identity information in recognizing people identified in images.

Various object and/or facial recognition techniques may be used. For example, system 102 may use facial recognition techniques that use one or more of principal component analysis, linear discriminate analysis, elastic bunch graph matching, hidden Markov models, and dynamic link matching. It will be appreciated that implementations may use other known or later developed facial recognition algorithms, techniques, and/or systems.

Figure 5:
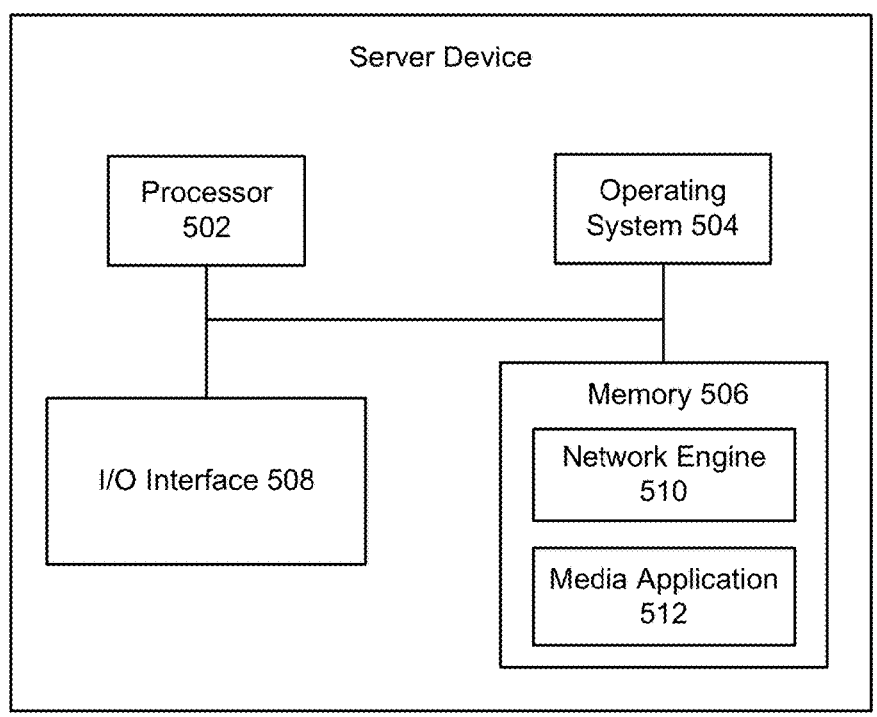
FIG. 5 illustrates a block diagram of an example computing device, according to some implementations.

FIG. 5 illustrates a block diagram of an example computing device 500, according to some implementations. For example, computing device 500 may be used to implement server device 104 of FIG. 1, as well as to perform the method implementations described herein. Implementations described herein may be carried out locally on a user device, on a server, or a combination of both. In some implementations, computing device 500 includes a processor 502, an operating system 504, a memory 506, and an input/output (I/O) interface 508. Server device 500 also includes a network engine 510 and a media application 512, which may be stored in memory 506 or on any other suitable storage location or non-transitory computer-readable medium. Media application 512 provides instructions that enable processor 502 to perform the functions described herein and other functions.

A "processor" such as processor 502 includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, and/or non-transitory tangible media including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

For ease of illustration, FIG. 5 shows one block for each of processor 502, operating system 504, memory 506, I/O interface 508, network engine 510, and media application 512. These blocks 502, 504, 506, 508, 510, and 512 may represent multiple processors, operating systems, memories, I/O interfaces, network engines, and applications. In other implementations, computing device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

What is claimed is:

1. A computer-implemented method to process video, the method comprising:
classifying one or more objects in a plurality of frames of the video;
determining one or more filter parameters of one or more filters based on the classifying of the one or more objects;
smoothing the one or more determined filter parameters based on the classifying of the one or more objects, wherein smoothing the one or more determined filter parameters includes adjusting one or more magnitudes of the one or more determined filter parameters across adjacent frames of the plurality of frames; and
applying the one or more filters to the plurality of frames of the video to modify one or more pixels of the plurality of frames of the video, wherein applying the one or more filters includes inputting the one or more smoothed filter parameters to the one or more filters and determining pixel values from the one or more filters.

2. The method of claim 1, further comprising tracking one or more of the objects across the plurality of frames of the video, wherein the smoothing of the one or more determined filter parameters is based on the tracking of the one or more tracked objects.

3. The method of claim 1, wherein adjusting one or more magnitudes of the one or more determined filter parameters across adjacent frames of the plurality of frames includes adjusting one or more thresholds used to determine the one or more magnitudes.

4. The method of claim 1, wherein one or more of the filters comprise one or more of a brightness filter, a contrast filter, a saturation filter, a tonal structure filter, a color filter, and a vignette filter.

5. The method of claim 1, further comprising smoothing the classifying by adjusting at least one confidence threshold.

6. The method of claim 1, wherein the classifying is based on one or more classification operations, wherein the smoothing the one or more determined filter parameters comprises smoothing the one or more classification operations, wherein the smoothing the one or more classification operations comprises smoothing a classification confidence interval across multiple frames, and wherein the multiple frames includes the plurality of frames.

7. The method of claim 1, further comprising ranking the one or more objects, wherein applying the one or more filters is based on the ranking.

8. The method of claim 1, further comprising smoothing one or more outputs of one or more of the filters based on an average of the one or more outputs across multiple frames of the video.

9. A non-transitory computer-readable storage medium carrying program instructions thereon to process video, the instructions when executed by one or more processors cause the one or more processors to perform operations comprising:
determining one or more confidence thresholds used in object detection for a video;
classifying one or more objects in a plurality of frames of the video into one or more classifications based on detecting the one or more objects using confidence values relative to the one or more confidence thresholds;
smoothing the one or more classifications of the one or more objects by adjusting the confidence values across multiple frames of the video;
determining one or more filter parameters of one or more filters based on the one or more classifications of the one or more objects; and
applying the one or more filters to one or more frames of the plurality frames of the video to modify one or more pixels of the one or more frames of the plurality of frames of the video, wherein applying the one or more filters includes inputting the one or more filter parameters to the one or more filters and determining pixel values from the one or more filters.

10. The non-transitory computer-readable storage medium of claim 9, wherein smoothing the one or more classifications includes adjusting at least one of the one or more confidence thresholds.

11. The non-transitory computer-readable storage medium of claim 9, wherein the one or more filters comprise one or more of a brightness filter, a contrast filter, a saturation filter, a tonal structure filter, a color filter, and a vignette filter.

12. The non-transitory computer-readable storage medium of claim 9, wherein the instructions further cause the one or more processors to perform operations comprising smoothing one or more of the determined filter parameters based on the classifying of the one or more objects, wherein smoothing the one or more determined filter parameters includes adjusting one or more magnitudes of the one or more determined filter parameters across adjacent frames of the plurality of frames.

13. The non-transitory computer-readable storage medium of claim 9, wherein the instructions further cause the one or more processors to perform operations comprising smoothing one or more of the determined filter parameters based on the classifying of the one or more objects.

14. The non-transitory computer-readable storage medium of claim 9, wherein the instructions further cause the one or more processors to perform operations comprising smoothing one or more outputs of at least one of the one or more filters based on average outputs from the one or more filters across two or more frames of the video.

15. A system to process video, the system comprising:
one or more processors; and
logic encoded in one or more non-transitory tangible media for execution by the one or more processors and when executed operable to perform operations comprising:
determining one or more filter parameters of one or more filters based on one or more frames of a video;
smoothing the one or more determined filter parameters based on the one or more frames of the video;
inputting the one or more smoothed filter parameters to the one or more filters and obtaining filter output values from the one or more filters across a plurality of frames of the video;
smoothing the one or more outputs of the one or more filters based on an average of the filter output values across the plurality of frames of the video, wherein the plurality of frames includes the one or more frames; and
applying the smoothed one or more outputs to modify one or more pixels of the plurality of frames of the video.

16. The system of claim 15, wherein the logic when executed is further operable to perform operations comprising tracking one or more objects across a plurality of frames of the video, wherein the plurality of frames includes the one or more frames, and wherein the smoothing of the one or more determined filter parameters is based on the tracking of the one or more tracked objects.

17. The system of claim 15, wherein, to determine the one or more filter parameters, the logic when executed is further operable to perform operations comprising:
classifying one or more objects in the one or more frames of the video into one or more classifications, wherein the classifying is based on detecting the one or more objects using one or more confidence thresholds; and
smoothing the one or more classifications used for object detection by adjusting confidence values determined for the one or more objects across multiple frames of the video.

18. The system of claim 15, wherein the one or more filters comprise one or more of a brightness filter, a contrast filter, a saturation filter, a tonal structure filter, a color filter, and a vignette filter.

19. The system of claim 15, wherein the logic when executed is further operable to perform operations comprising classifying the one or more objects in the one or more frames of the video, wherein the logic when executed is further operable to perform operations comprising smoothing one or more confidence thresholds used for object detection by adjusting the one or more confidence thresholds, wherein the classifying is based on the one or more smoothed confidence thresholds.

20. The system of claim 15, wherein the average is a weighted average of filter output values across the plurality of frames.

* * * * *